United States Patent Office 3,511,576
Patented May 12, 1970

3,511,576
DEVICE FOR CONTROLLING THE BLEED OF AIR FROM A GAS TURBINE ENGINE COMPRESSOR
Karl Herbstritt, and Walter George Cross, Derby, England, assignors to Rolls-Royce Limited, Derby, England, a British company
Filed Sept. 22, 1967, Ser. No. 669,836
Claims priority, application Great Britain, Oct. 17, 1966, 46,378/66
Int. Cl. F01c *21/16;* F02c *9/02;* F04d *27/02*
U.S. Cl. 415—27                                    15 Claims

ABSTRACT OF THE DISCLOSURE

A gas turbine engine has a compressor bleed valve which is opened and closed under the control of a fluid logic device which is actuated by compressor pressures.

---

Figure 1:
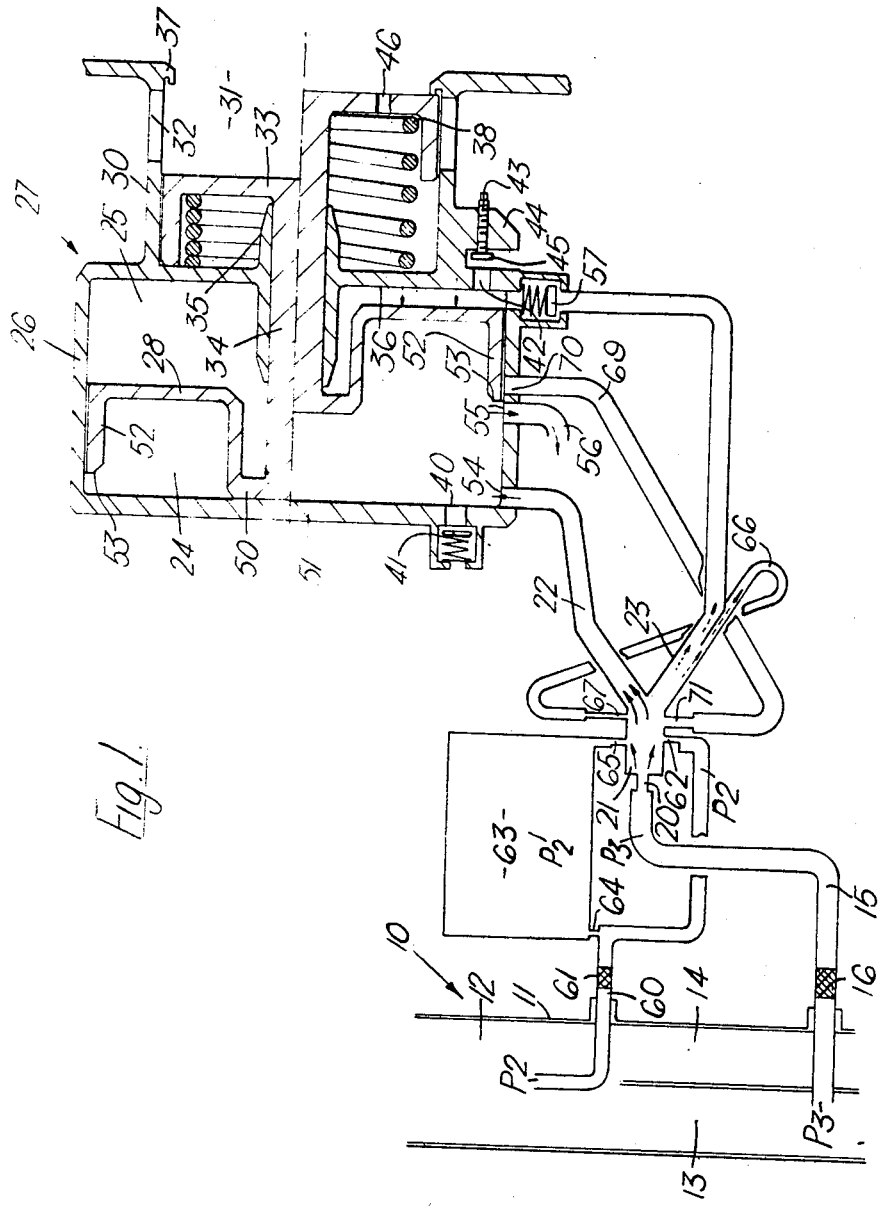

This invention concerns a device for controlling the bleed of air from a gas turbine engine compressor. Such devices may be required both during normal operation of a gas turbine engine and when surging of the compressor of the engine would otherwise be imminent.

According to the present invention, there is provided a device comprising a bleed valve, for controlling a bleed of air from a compressor of a gas turbine engine, means for delivering pressure fluid from a common duct to two conduits, pressure responsive means which are responsive to the pressure in at least a particular one of said conduits and which effect predetermined movement of the bleed valve when there is a predetermined change in the pressure fluid supply from said common duct to said one conduit, and means for employing at least one control jet of air which has been compressed by the said compressor to control the relative quantities of the said pressure fluid which pass from said common duct into the said conduits in dependence upon the pressure, or relative pressures, of the said control jet or jets.

Retaining means whose operation may be cancelled may be provided such that, when the pressure fluid supply from the common duct to the said one conduit has been increased, the increased supply of pressure fluid continues to pass from the common duct to the said one conduit until the operation of the retaining means has been cancelled. Thus, the said retaining means preferably comprises a bleed passage into which there is bled a part of the pressure fluid supplied to the said one conduit from the common duct, and means for directing the pressure fluid from the bleed passage and into the common duct as a further jet which urges at least the greater part of the said pressure fluid supply to pass from the common duct to the said one conduit.

Means may be provided such that, when the bleed valve is closed, a still further jet of pressure fluid is directed into the common duct so as to urge the pressure fluid to pass from the common duct to the other of said conduits.

The bleed valve may be integrally formed with the pressure responsive means.

The means for employing the control jet or jets of air may comprise air ducting which is adapted to direct the said control jet or jets into and transversely of the said common duct so as normally to deflect the pressure fluid flowing through the latter preferentially towards the other of said conduits.

Two oppositely directed control jets may be provided, one of which (which is directed towards the other said conduit) is supplied with air directly from the said air ducting and the other of which (which is directed towards the said one conduit) is supplied with air from a chamber which has restricted communication with the air ducting, the arrangement being such that the pressure of the said one control jet is greater than that of the said other control jet except when the pressure in the said air ducting falls suddenly.

Alternatively, there may be two oppositely directed control jets which are arranged to be respectively supplied with air at pressures functionally related respectively to two different air pressures or to one or more mass flows in the engine, a predetermined alteration in the ratio of the said air pressures or in the mass flow causing the relative force of the two oppositely directed control jets to be altered. The relative force of the control jets may also be altered on movement of the bleed valve, so as to oppose movement of the latter. Thus, one of the control jets may be supplied with air through a passage having a variable restrictor therein, the bleed valve being connected to the variable restrictor to position the latter.

Means may be provided to ensure that the bleed valve opens more quickly than it closes. Thus, the pressure responsive means may comprise a double acting piston which is slidably mounted in a cylinder and which separates two spaces within the cylinder from each other, each said space respectively communicating with one of the said two conduits and with a vent passage, the means for ensuring that the bleed valve opens more quickly than it closes comprising means for imposing a greater restriction on the flow through one of said vent passages than on the flow through the other.

The said one vent passage may be provided with an adjustable restrictor.

The invention also comprises a gas turbine engine having a compressor provided with a device as set forth above.

The invention is illustrated, merely by way of example, in the accompanying drawings, in which:

FIGS. 1 to 5 are diagrammatic sectional views respectively illustrating five different embodiments of devices according to the present invention for controlling the bleed of air from a gas turbine engine compressor.

The terms "left," "right," "upper" and "lower" as used in the description below are to be understood to refer to directions as seen in the drawings.

In FIG. 1 there is shown, a gas turbine engine 10 having an outer casing 11 within which there is mounted a low pressure compressor 12. Part of the air compressed by the low pressure compressor 12, which leaves the delivery end thereof at a pressure $P_2$, passes to a high pressure compressor 13 and thence via combustion equipment (not shown) to high and low pressure turbines (not shown). Another part of the air which has been compressed by the low pressure compressor 12 to the pressure $P_2$ passes to a by-pass duct 14, the flow through the by-pass duct 14 by-passing the said combustion equipment and turbines. The air passing through the by-pass duct 14 may, if desired, be mixed with the exhaust gases which have passed through the turbines.

A duct 15, which contains a filter 16, extends through the by-pass duct 14, the upstream end of the duct 15 being adapted to receive part of the air which has been compressed in the high pressure compressor 13 to a pressure $P_3$.

The duct 15 communicates, by way of a restriction 20, with a duct 21 from which the air from the high pressure compressor 13 may pass into conduits 22, 23. The conduits 22, 23 respectively communicate with spaces 24, 25 within a cylindrical portion 26 of a housing 27, the spaces 24, 25 being separated from each other by a double-acting piston 28 which is slidably mounted in the cylindrical portion 26. The upper and lower halves of the piston 28 are shown in FIG. 1 in two different positions to illustrate the operation thereof, but it will, of course, be understood that in fact the piston 28 is not split in half.

The housing 27 has a reduced diameter axial extension 30 whose interior 31 is open, by means not shown, to receive air compressed by the low pressure compressor 12. The extension 30 has a plurality of angularly spaced apart bleed ports 32 therein, which may be opened and closed by a bleed valve 33. The bleed valve 33 is integrally connected to the piston 28 by a rod 34 which is slidably mounted in a sleeve portion 35 of the housing 27, the sleeve portion 35 being connected to the cylindrical portion 26 by a wall 36.

When the bleed valve 33 is in the upper position illustrated in FIG. 1, i.e. when it is urged to the left, the bleed ports 32 are opened and the compressed air from the compressor 12, which has been supplied to the interior 31, may pass through the bleed potrs 32 so as to pass (by means not shown) to atmosphere.

Such bleeding of air through the bleed ports 32 is, however, prevented when the bleed valve 33 is in the lower position indicated in FIG. 1, i.e. when it is urged towards the right. In this position it engages a flange 37 of the extension 30, the bleed valve 33 being urged towards the closed position by a spring 38 which acts between the bleed valve 33 and the wall 36.

The space 24 communicates with a vent passage 40 the flow through which is controlled by a pressure reducing valve 41. The space 25 communicates with a vent passage 42. A stud 43, which is threaded into a flange 44 of the housing 27, has a head 45 which is disposed adjacent to the vent passage 42 so that rotation of the stud 43 causes the head 45 to act as an adjustable restrictor controlling the flow through the vent passage 42.

The arrangement is such that if the piston 28 moves towards the left, whereby to effect opening of the bleed valve 33, air in the space 24 may pass out readily through the vent passage 40, whereas if the piston 28 is moved toward the right so as to effect closure of the bleed valve 33, air in the space 25 will be forced out relatively slowly through the vent passage 42. Thus, the bleed valve 33 may be opened more quickly than it may be closed. As will be appreciated, adjustment of the stud 43 alters the rate at which the bleed valve 33 can be closed.

The bleed valve 33 has a vent passage 46 therein to permit escape of air from the space within it when the bleed valve is moved to the left.

The piston 28 has a centrally disposed head 50 which is engageable with an end wall 51 of the cylindrical portion 26. The piston 28 has a skirt 52 which concentrically surrounds the head 50 and which is slidably mounted within the cylindrical portion 26. The left hand end 53 of the skirt 52 is spaced from the left hand end of the head 50 so as to ensure that the conduit 22 may, via a port 54, communicate at all times with the space 24.

The end 53 of the skirt 52 just clears an outlet port 55 in the cylindrical portion 26 when the bleed valve 33 is fully closed, the outlet port 55 communicating with a vent passage 56 through which air in the space 24 can escape to atmosphere.

The conduit 23 communicates with the space 25 by way of a non-return valve 57 which permits flow only in the direction towards the space 25.

A duct 60, which contains a filter 61, extends across the by-pass duct 14 to receive air which has been compressed by the low pressure compressor 12 to the pressure $P_2$. The downstream end of the duct 60 communicates with the duct 21 by way of a restriction 62 so that a jet of air from the low pressure compressor 12 may be directed into and transversely of the duct 21 and in the general direction of the conduit 22.

A chamber 63, which communicates with the duct 60 by way of a restriction 64, also communicates with the duct 21 by way of a restriction 65. A jet of air may thus be directed from the restriction 65 into and transversely of the duct 21 and in the general direction of the conduit 23.

A bleed passage 66 communicates with the conduit 23 so as to receive part of the air supplied thereto. The downstream end of the bleed passage 66 communicates with the duct 21 by way of a restriction 67. A jet of air from the restriction 67 may thus be directed into and transversely of the duct 21 so as to urge at least the greater part of the air supply to pass from the duct 21 into the conduit 23.

A passage 69 communicates with a port 70 in the cylindrical portion 26. When the piston 28 is in the upper position shown, and the bleed valve 33 is therefore open, the port 70 is also open so as to permit air to flow from the space 25 and through the passage 69. When, however, the piston 28 is in the lower position shown and the bleed valve 33 is therefore closed, the port 70 is also closed so as to permit air being supplied to the passage 69.

The pasage 69 communicates, at its end remote from the port 70, with a restriction 71 communicating with the duct 21. A jet of air from the restriction may thus be directed into and transversely of the duct 21 so as to urge air passing through the duct 21 to pass to the conduit 22. Such a jet of air will of course be directed into the duct 21 only when the bleed valve 33 is closed.

During normal operation of the gas turbine engine 10, i.e. when a surge is not imminent, the jet of air from the restriction 62 is arranged to be more powerful than that from the restriction 65. The air passing through the duct 21 is therefore normally deflected preferentially towards the conduit 22. The construction of the device constituted by the parts 21, 22, 23 is, in any case, such that there is an inherent tendency for the air passing through the duct 21 to pass to the conduit 22, i.e. the device is monostable.

The air so supplied to the conduit 22 passes to the space 24 and thus urges the piston 28 towards the right, whereby the bleed valve 33 closes the bleed ports 32. In moving towards the right, the air in the space 25 is forced out through the vent passage 42 and since the flow through this vent passage 42 is restricted by the head 45 of the stud 43, closure of the bleed valve 33 will be relatively slow. When the bleed valve 33 has been completely closed, the port 55 will be open to permit air from the space 24 to be vented to atmosphere through the vent passage 56.

During this closing movement of the bleed valve 33, air in the space 25 will not be able to pass into the conduit 23 since this will be prevented by the non-return valve 57.

If, however, the pressure of the air flowing through the duct 60 falls rapidly as a result of the compressor 12 being about to surge, the pressure of the jet from the restriction 62 will immediately fall, whereas that of the jet from the restriction 65 will temporarily remain substantially unaffected. Thus, whereas the pressure of the jet from the restriction 62 is normally greater than that from the restriction 65, in these conditions, it is arranged that the force of the jet from the restriction 65 is greater than that of the jet from the restriction 62. Accordingly, air flowing through the duct 21 will be directed into the conduit 23.

Once air is supplied to the conduit 23, air will also be supplied to the bleed passage 66 and there will thus be a jet into the duct 21 from the restriction 67. The bleed passage 66 and restriction 67 thus operates as a retaining arrangement whose operation may be cancelled, but which, when operative, ensures that when the air supply from the duct 21 to the conduit 23 has been established, air continues to pass from the duct 21 to the conduit 23 until the operation of this retaining device has been cancelled.

It will be appreciated that it is necessary to arrange that this does not occur until the pressure from the low pressure compressor 12 is falling at a rate characteristic of surging, and thus at a rate which is greater than that which occurs in slam decelerations, and is also less than that which occurs during surging at altitude.

On air being supplied to the conduit 23, this air passes through the non-return valve 57 to the space 25 so as to urge the piston 28 leftwards. As explained above, this causes swift opening of the bleed valve 33. In the course of this opening movement of the bleed valve 33, the piston 28 will push the air in the space 24 out through the vent passage 56, and, when this has been closed by the skirt 52, out through the vent passage 40. When the bleed valve 33 is fully open, the conduit 22 will continue to communicate with the space 24 by way of the port 54, but the port 70 will also be open. This will allow air to be supplied from the space 25 to the passage 69 and so supply a jet through the restriction 71 into the duct 21. If at this time surging is no longer imminent and the jet from the restriction 65 is therefore no longer greater in force than that from the restriction 62, the jet from the restriction 71 will cause the air from the duct 21 to pass to the conduit 22 and thus effect closure of the bleed valve 33.

In the device of FIG. 1, the device is not rendered operative except when surging occurs. In the devices shown in FIGS. 2 to 5, however, the devices incorporate bleed valves which are opened and closed during normal operation of the engine, i.e. not merely at times when surging occurs.

Figure 2:
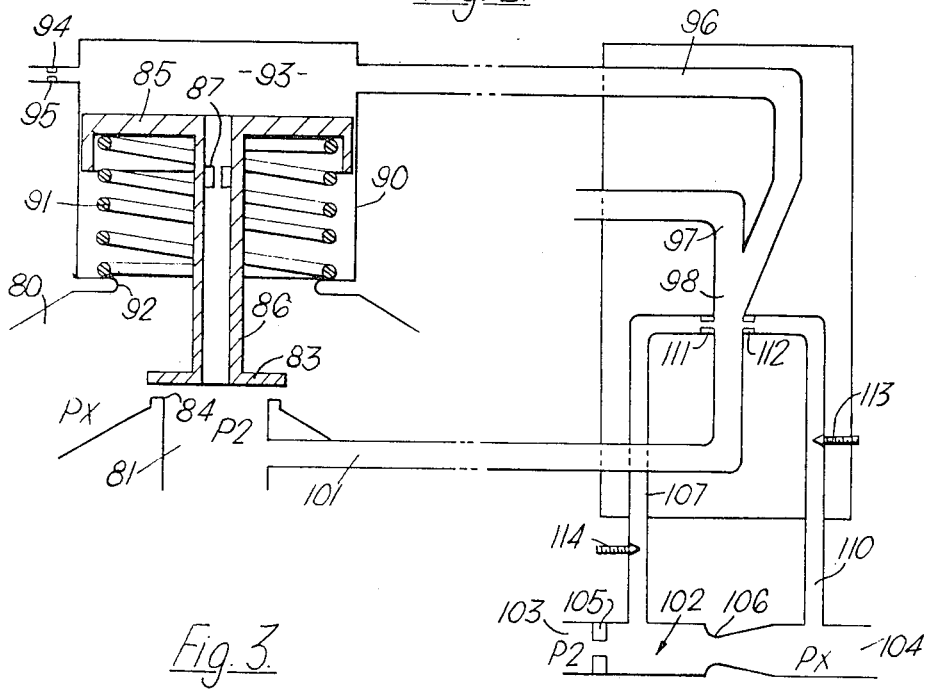

In FIG. 2, there is shown a by-pass passage 80 of a three shaft gas turbine engine (not shown). The by-pass passage 80, which contains air at a pressure $P_x$, communicates with a bleed passage 81 which receives air at the pressure $P_2$ from the low pressure compressor (not shown) of the engine. Communication between the bleed passage 81 and the by-pass passage 80 is controlled by a bleed valve 83 which is adapted to cooperate with a valve seat 84 on the bleed passage 81.

The bleed valve 83 is formed integrally with a piston 85 to which it is connected by a hollow stem 86. The hollow stem 86 may, as shown, have a restriction 87 therein which may be adjusted by means not shown.

The piston 85 is slidably mounted within a cylinder 90 and is urged upwardly therein by a spring 91 which acts between the underside of the piston 85 and an internal flange 92 of the cylinder 90. The spring 91 urges the bleed valve 83 towards the open position.

The cylinder 90 has a space 93 therein above the piston 85, air in the space 93 being able to pass to atmosphere through an exhaust passage 94 having a restriction 95 therein. The space 93 communicates with a conduit 96 which, together with a conduit 97, communicates with a common duct 98. The conduit 97 is vented to atmosphere by virtue of communicating (by means not shown), with the by-pass passage 80.

The restrictions 87 and 95 are provided to enable a particular kind of response to be achieved. It is, however, conceivable that one or both of these restrictions may require to be blanked off.

The common duct 98 is, by way of a duct 101, supplied from the bleed passage 81 with air at the pressure $P_2$. The parts 96, 97, 98 form a monostable device such that the air passing through the common duct 98 has an inherent tendency to pass into the conduit 97 so as to have no effect on the piston 85. The latter is therefore normally urged upwardly by the spring 91 and the bleed valve 83 is thus normally open.

Opposite ends 103, 104 of a conduit 102 communicate, by means not shown, with air at the said pressures $P_2$, $P_x$ respectively, the conduit 102 containing axially spaced restrictions 105, 106. An air duct 107, containing an adjustable restrictor 114, communicates with the space between the restrictions 105, 106, while an air duct 110 containing an adjustable restrictor 113, communicates with the space between the restriction 106 and the end 104 of the passage 102. The air ducts 107, 110 communicate with the duct 98 at oppositely disposed restrictions 111, 112 respectively.

The pressure $P_2$ is normally substantially higher than the pressure $P_x$ and for example, these pressures may respectively be 50 lbs. per square inch absolute and 20 lbs. per square inch absolute. The pressure in the duct 107 will, however, by virtue of the provision of the restriction 105 be less than that of $P_2$, and the restrictors 113, 114 are adjusted to positions such that the jet of air passing into the duct 98 through the restriction 112 normally has a greater force than the jet of air passing into the duct 98 from the restriction 111, whereby the air passing through the duct 98 passes into the conduit 97.

However, if the ratio of the pressures $P_2/P_x$ should rise to a predetermined value, the oppositely directed control jets 111, 112 which are thus supplied with air at pressures functionally related to the pressures $P_2$, $P_x$, will have their relative forces reversed, as a result of which the air passing through the ducts 98 will be directed into the conduit 96 and will therefore act on the piston 85 to close the bleed valve 83.

If there is an increase in engine speed after the bleed valve 83 has been closed, this will merely increase the ratio $P_2/P_x$ and thus increase the force with which the air from the duct 98 is forced into the conduit 96. At the same time the pressure of the air supplied to the conduit 96 will also be increased. On decelerating the engine, however, the pressure in the conduit 96 decreases, but the bleed valve 83 will remain closed until the ratio $P_2/P_x$ has fallen to the said predetermined value.

Alaternatively, instead of employing the pressure $P_2$ to operate the piston 85, it would, of course, be equally possible to employ for this purpose the pressure $P_3$ at the downstream end of the high pressure compressor (not shown) of the engine.

Figure 3:
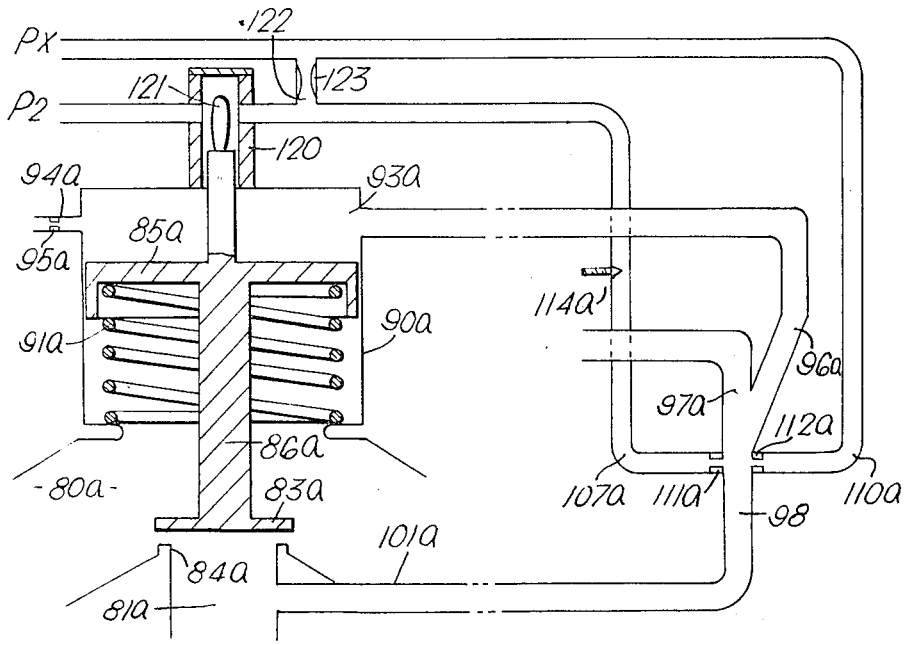

In FIG. 3 there is shown a device similar to that of FIG. 2, and which, for this reason will not be described in detail, similar parts being given the same reference numerals with the addition of the suffix $a$.

In the FIG. 3 construction, however, the air ducts 107a, 110a do not communicate with the passage 102. The air duct 107a however, communicates with a source of air at the pressure $P_2$ by way of the interior of a cylinder 120 which is disposed above the cylinder 90a and which has slidably mounted in it a variable restrictor 121 which is secured to the piston 85a. Thus the position of the variable restrictor 121, and hence the pressure of the jet issuing from the restriction 111a, is dependent upon the position of the piston 85a.

The air conduit 110a, which communicates with the air conduit 107a by way of a conduit 122 containing a restriction 123, communicates with a source of air at the pressure $P_x$. The arrangement is thus such that the relative force of the control jets 111a, 112a, is altered on movement of the bleed valve 83a so as to oppose closing movement of the latter. Thus, progressive movement of the bleed valve 83a is produced.

Although the embodiments of FIGS. 2 and 3 have been referred to as using pressures $P_2$, $P_x$, any two pressures prevailing in the compressor can be used.

Figure 4:
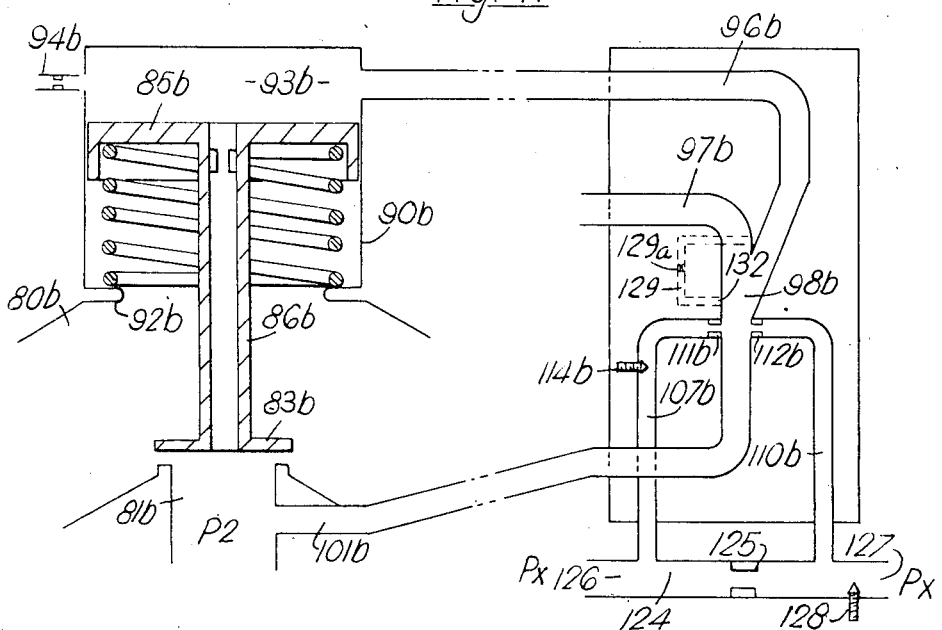

In FIG. 4 there is shown an arrangement which is also similar to that of FIG. 2, and which for that reason will not be described in detail, similar parts being given the same reference numerals with the addition of the suffix $b$.

In the FIG. 4 construction, however, the air ducts 107b and 110b communicate with a duct 124 to opposite sides of a restriction 125 therein. The duct 124, which has a variable restrictor 128 therein, has opposite ends 126, 127 which are respectively open to the total pressure $P_x$ and the static pressure $p_x$ in the by-pass passage 80b. The control jets 111b, 112b will lthus have a relative force whose value depends upon the mass flow through the by-pass passage 80b.

If desired, and as indicated by dotted lines, a bleed passage 129, containing a hold-on relay 129a, may be arranged to receive air from the conduit 96b when the latter is itself supplied with air from the duct 98b. The bleed passage 130 communicates with the duct 98b at a restriction 132 through which a jet of air may be directed into the duct 98b so as to urge the air to pass therefrom and into the conduit 96b.

Figure 5:
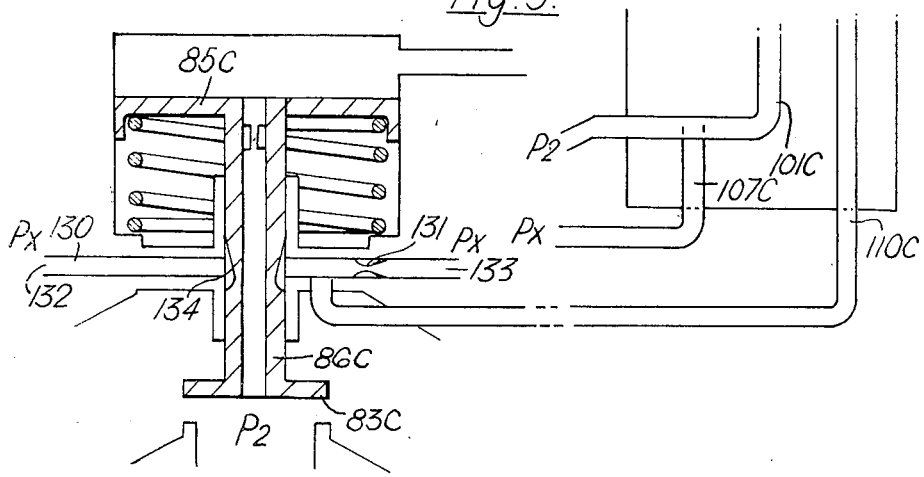

In FIG. 5, part of an arrangement is shown which is generally similar to that of FIG. 4, and which for this reason will not be described in detail, similar parts being given the same reference numerals, with the addition of the suffix c.

In the FIG. 5 construction, however, the air duct 110c, instead of communicating with the duct 124, communicates with a duct 130 upstream of a restriction 131 therein. Thet duct 130 has opposite ends 132, 133 which are open, by means not shown, to supplies of air at the pressures $P_x$ and $p_x$. Flow through the duct 130 is controlled by the stem 86c which has a tapering portion 134. Thus, as the piston 85c is urged downwardly to effect closure of the bleed valve 83c, this closing movement of the bleed valve 83c is to some extent resisted by virtue of the fact that the tapering portion 134 will exercise an increasing restrictive effect on passage of air through the conduit 130.

We claim:

1. In a gas turbine engine having a compressor, combustion equipment and turbine means, the improvement comprising: a device comprising a bleed valve operatively connected to said compressor for controlling a bleed of air from said compressor, a common duct operatively connected to said compressor to receive fluid under pressure therefrom, two conduits communicating with said common duct, means for delivering pressure fluid from said common duct to said two conduits, pressure responsive means which are responsive to the pressure in at least a particular one of said conduits and which effect predetermined movement of the bleed valve when there is a predetermined change in the pressure fluid supply from said common duct to said on conduit, means operatively connected to said compressor and employing at least one control jet receiving air compressed by the said compressor to control the relative quantities of the said pressure fluid which pass from said common duct into the said conduits in functional dependence upon the pressure of the said control jet.

2. The gas turbine engine as claimed in claim 1 in which the bleed valve is integrally formed with the pressure responsive means.

3. The gas turbine engine as claimed in claim 1 in which means are provided to ensure that the bleed valve opens more quickly than it closes.

4. The gas turbine engine as claimed in claim 3 in which the pressure responsive means comprises a double acting piston which is slidably mounted in a cylinder and which separates two spaces within the cylinder from each other, each said space respectively communicating with one of the said two conduits and with a vent passage, the means for ensuring that the bleed valve opens more quickly than it closes comprising means for imposing a greater restriction on the flow through one of said vent passages than on the flow through the other.

5. The gas turbine engine as claimed in claim 1 in which retaining means whose operation maybe cancelled are provided such that, when the pressure fluid supply from the common duct to the said one conduit has been increased, the increased supply of pressure fluid continues to pass from the common duct to the said one conduit until the operation of the retaining means has been cancelled.

6. The gas turbine engine as claimed in claim 5 in which the said retaining means comprises a bleed passage into which there is bled a part of the pressure fluid supplied to the said one conduit from the common duct, and means for directing the pressure fluid from the bleed passage and into the common duct as a further jet which urges at least the greater part of the said pressure fluid supply to pass from the common duct to the said one conduit.

7. The gas turbine engine as claimed in claim 6 in which means are provided such that, when the bleed valve is closed, a still further jet of pressure fluid is directed into the common duct so as to urge the pressure fluid to pass from the common duct to the other of said conduits.

8. The gas turbine engine as claimed in claim 1 in which the means for employing the control jet of air comprises air ducting which is adapted to direct the said control jet into and transversely of the said common duct so as normally to deflect the pressure fluid flowing through the latter preferentially towards the other of said conduits.

9. The gas turbine engine as claimed in claim 8 in which there are two oppositely directed control jets one of which (which is directed towards the other said conduit) is supplied with air directly from the said air ducting, and the other of which (which is directed towards the said one conduit) is supplied with air from a chamber which has restricted communication with the air ducting, the arrangement being such that the pressure of the said one control jet is greater than that of the said other control jet except when the pressure in the said air ducting falls suddenly.

10. The gas turbine engine as claimed in claim 8 in which there are two oppositely directed control jets which are arranged to be respectively supplied with air at pressures functionally related respectively to two different air pressures or to at least one mass flow in the engine, a predetermined alternation in the ratio of the said air pressures or in the mass flow causing the relative force of the two oppositely directed control jets to be altered.

11. The gas turbine engine as claimed in claim 10 in which the relative force of the control jets is also altered on movement of the bleed valve, so as to oppose movement of the latter.

12. The gas turbine engine as claimed in claim 11 in which one of the control jets is supplied with air through a passage having a variable restrictor therein, the bleed valve being connected to the variable restrictor to position the latter .

13. A device comprising a bleed valve for controlling the bleed of air from a compressor of a gas turbine engine, two conduits and a common duct communicating therewith, means for delivering pressure fluid compressed by the compressor from the common duct to the two conduits, pressure responsive means which are responsive to the pressure in at least a particular one of said conduits and which effect predetermined movement of the bleed valve when there is a predetermined change in the pressure fluid supply from said common duct to said one duct, and air ducting which is adapted to direct two oppositely directed control jets of air into and transversely of the common duct so as to normally deflect the pressure fluid flowing through the latter preferentially towards the other of said conduits, said control jets being arranged to be respectively supplied with air at pressures functionally related to two different air pressures or to at least one mass flow in the engine, a predetermined alteration in the ratio of the said air pressures or in the mass flow causing the relative force of the two oppositely directed control jets to be altered, the relative force of the control jets being also altered on movement of the bleed valve, so as to oppose movement of the latter, one of the control jets being supplied with air through a passage having a variable restrictor therein, the bleed valve being connected to the variable restrictor to position the latter.

14. A device comprising a bleed valve for controlling a bleed of air from a compressor of a gas turbine engine, two conduits and a common duct communicating therewith, means for delivering pressure fluid compressed by the compressor from the common duct to the two conduits, pressure responsive means which are responsive to the pressure in at least a particular one of said conduits and which effect predetermined movement of the bleed valve when there is a predetermined change in the pressure fluid supply from said common duct to said one conduit, means for employing at least one control jet of air which has been compressed by the compressor to control the relative quantities of the said pressure fluid which pass from said common duct into said conduits in functional dependence upon the pressure of the said control jet, and means to ensure that the bleed valve opens more quickly than it closes, the pressure responsive means comprising a double acting piston which is slidably mounted in a cylinder and which separates two spaces within the cylinder from each other, each said space respectively communicating with one of the said two conduits and with a vent passage, the means for ensuring that the bleed valve opens more quickly than it closes comprising means for imposing a greater restriction on the flow through one of said vent passages than on the flow through the other.

15. A device as claimed in claim 14 in which the said one vent passage is provided with an adjustable restrictor.

References Cited

UNITED STATES PATENTS

| | | | |
|---|---|---|---|
| 3,266,510 | 8/1966 | Wadey | 137—81.5 |
| 3,392,739 | 7/1968 | Taplin et al. | 137—36 XR |
| 3,393,692 | 7/1968 | Geary | 137—81.5 XR |
| 3,396,619 | 8/1968 | Bowles et al. | 137—81.5 XR |
| 3,396,631 | 8/1968 | Woodward | 137—8.15 XR |
| 3,407,828 | 10/1968 | Jones | 137—8.15 |
| 3,409,037 | 11/1968 | Nelson | 137—469 XR |
| 2,978,166 | 4/1961 | Hahn | 230—115 |
| 2,986,327 | 5/1961 | Hunter | 230—115 |
| 3,027,904 | 4/1962 | Silver | 230—115 |
| 3,047,210 | 7/1962 | Best | 230—115 |

FOREIGN PATENTS 1,278,781 11/1961 France.

SAMUEL SCOTT, Primary Examiner

U.S. Cl. X.R.

91—52; 137—81.5